United States Patent
Ito et al.

(10) Patent No.: US 7,129,193 B2
(45) Date of Patent: Oct. 31, 2006

(54) CATALYST BODY

(75) Inventors: Miho Ito, Aichi-pref. (JP); Jun Hasegawa, Hekinan (JP); Tosiharu Kondo, Toyoake (JP); Tomohiko Nakanishi, Kariya (JP)

(73) Assignee: Denso Corporation, Kariya (JP)

( * ) Notice: Subject to any disclaimer, the term of this patent is extended or adjusted under 35 U.S.C. 154(b) by 568 days.

(21) Appl. No.: 10/364,532

(22) Filed: Feb. 12, 2003

(65) Prior Publication Data

US 2003/0158035 A1     Aug. 21, 2003

(30) Foreign Application Priority Data

Feb. 14, 2002 (JP) .............................. 2002-037033

(51) Int. Cl.
    *B01J 23/00* (2006.01)
    *B01J 35/00* (2006.01)

(52) U.S. Cl. .................. 502/300; 502/302; 502/305; 502/324; 502/325; 502/344; 502/349; 502/353; 502/355; 502/527.24; 502/304

(58) Field of Classification Search ............... 502/300, 502/302, 305, 324, 325, 344, 349, 353, 355, 502/527.24, 304
See application file for complete search history.

(56) References Cited

U.S. PATENT DOCUMENTS

| | | | |
|---|---|---|---|
| 3,956,186 A | 5/1976 | Iwase et al. | |
| 4,189,405 A | 2/1980 | Knapton et al. | |
| 4,956,329 A | 9/1990 | Chao et al. | |
| 5,346,722 A | 9/1994 | Beauseigneur et al. | |
| 5,489,865 A | 2/1996 | Colvin, Sr. | |
| 5,607,885 A | 3/1997 | Ichii et al. | |
| 5,716,899 A | 2/1998 | Guile et al. | |
| 6,171,573 B1 | 1/2001 | Sato | |
| 2003/0223933 A1* | 12/2003 | Sterte et al. | ................ 423/716 |
| 2005/0165267 A1* | 7/2005 | Canos et al. | ................ 585/940 |
| 2005/0171394 A1* | 8/2005 | Fuglerud et al. | ............ 585/640 |

FOREIGN PATENT DOCUMENTS

| EP | 1043067 A2 * | 10/2000 |
|---|---|---|
| EP | 1 243 329 A1 | 9/2002 |
| JP | A-2001-310128 | 11/2001 |

OTHER PUBLICATIONS

U.S. Appl. No. 09/546,227 pending.

* cited by examiner

*Primary Examiner*—Stanley S. Silverman
*Assistant Examiner*—Timothy C. Vanoy
(74) *Attorney, Agent, or Firm*—Nixon & Vanderhye P.C.

(57) ABSTRACT

This invention aims at providing a catalyst body exhibiting a lower degradation of a catalyst due to thermal durability and capable of keeping higher catalyst performance for a long time. A catalyst component such as Pt is directly supported by Zr, W, etc, replacing elements inside a support such as Al of cordierite to provide a catalyst body without forming a coating layer. A combination of the catalyst component and the element inside the support is selected so that support strength is greater than 5 eV by simulation using a density functional method. Coarsening of catalyst particles can be suppressed and a high-performance catalyst body excellent in thermal durability can be obtained.

11 Claims, 2 Drawing Sheets

CATALYST BODY

BACKGROUND OF THE INVENTION

1. Field of the Invention

Figure 1:
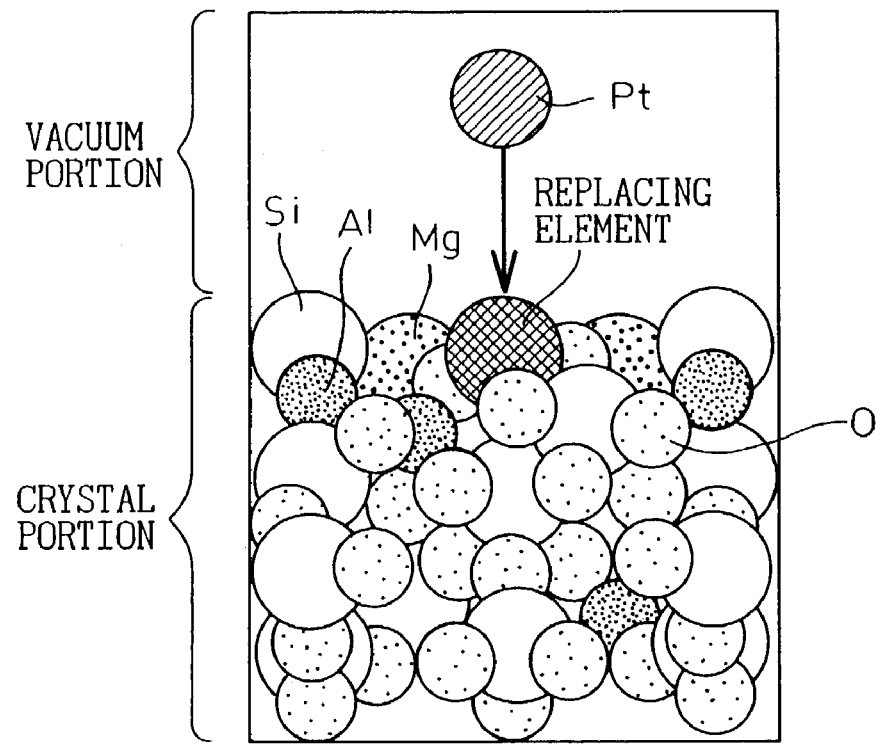

This invention relates to a catalyst body used for an exhaust gas purification catalyst of an automobile engine.

2. Description of the Related Art

Various catalysts have been proposed in the past to purify detrimental substances emitted from an automobile engine. The exhaust gas purification catalyst generally uses a cordierite honeycomb structure having a high terminal impact resistance as a support. After a coating layer, formed of γ-alumina, is formed on a surface, a catalyst precious metal such as Pt is supported. The reason why the coating layer is formed is because the cordierite has a small specific surface area and cannot, as such, support the catalyst component. A necessary amount of the catalyst component can be supported when the surface area of the support is increased by use of a high specific surface material such as γ-alumina.

However, the formation of the coating layer invites an increase of a thermal capacity of the support and is therefore disadvantageous for early activation. Also, as the open area becomes small, a pressure loss will increase. Moreover, because γ-alumina has low heat resistance by itself, there is the problem that the catalyst component undergoes aggregation and purification performance greatly drops. Therefore, a method of directly supporting a necessary amount of the catalyst component without forming the coating layer has been sought in recent years. For example, Japanese Examined Patent Publication (Kokoku) No. 5-50338 proposes a method that conducts acid treatment and heat treatment to elute specific components and improves the specific surface area of the cordierite itself. However, this method involves the problem that the acid treatment and the heat treatment destroy the crystal lattice of the cordierite and lower the strength.

On the other hand, the inventors have previously proposed a ceramic support that does not require a coating layer for improving a specific surface area but can support a necessary amount of catalyst components without lowering strength (Japanese Unexamined Patent Publication No. 2001-310128). This ceramic support forms micro pores that cannot be measured as a specific surface area such as oxygen defect and lattice defect in a crystal lattice, very fine cracks having a width of 100 nm or below, and supports a catalyst. Therefore, the ceramic support can directly support the catalyst component while keeping the strength.

However, it has been found that, when the fine pores are formed on the surface of the substrate ceramic in accordance with the method described in Japanese Unexamined Patent Publication No. 2001-310128 and a catalyst body directly supporting a catalyst component is subjected to a thermal durability test (at 1,000° C. for 24 hours in an atmosphere, for example), the catalyst particle diameter becomes greater in some cases than before the thermal durability test. This is because the support strength varies depending on the kind of the substrate ceramic and depending on the combination of the fine pores and the catalyst component. Unless bonding with the catalyst component is sufficient, the catalyst component moves due to thermal vibration and the particles will grow, thereby lowering the purification performance.

It is therefore an object of the invention to acquire a catalyst body that exhibits less degradation of a catalyst due to thermal durability but can keep a higher catalyst performance for a long time.

SUMMARY OF THE INVENTION

According to a first aspect of the invention, there is provided a catalyst body directly supporting a catalyst component on a surface of a support, wherein the catalyst component is directly supported by elements inside the support. The catalyst component can also be supported directly by fine pores formed in the support. In the invention, a combination of the catalyst component and the element or the fine pore inside the support is selected so that the support strength of the catalyst component by the element or the fine pore inside the support is greater than 5 eV by simulation using a density functional method.

In the catalyst body according to the invention, the catalyst component is directly supported by the element or fine pore inside the support through chemical adsorption. In comparison with ceramic bodies according to the prior art that use physical adsorption, the support strength is higher and thermal degradation is more difficult to occur. When the combination providing the support strength of at least 5 eV is selected by simulation using the density functional method, adsorption enters a region of chemical adsorption where an adsorption site has position selectivity, and the catalyst component is strongly adsorbed to the element or the fine pore. Therefore, movement of the catalyst particles and their coarsening due to thermal vibration can be suppressed, and a high-performance catalyst body excellent in thermal durability can be acquired.

In a second aspect of the invention, the support described above is a ceramic support. As the ceramic support is excellent in heat resistance, it is suitable for a catalyst that is used at a high temperature such as in an automobile.

In a third aspect of the invention, the element or the fine pore inside the support and the catalyst component are selected so that the support strength of the catalyst component by the element or the fine pore inside the support is at least 15 eV by simulation using the density functional method. In this way, the support strength can be further improved, and the catalyst body hardly undergoes degradation.

In a fourth aspect of the invention, the support described above has a construction in which one or more kinds of constituent elements of the substrate are replaced by elements other than the constituent elements. It is thus possible to easily introduce the element or elements that easily undergo chemical adsorption with the catalyst component into the support. As the replacing element directly supports the catalyst component, a catalyst body having desired support strength can be easily obtained.

In a fifth aspect of the invention, the replacing element is at least one kind of elements having a d or f orbit in an electron orbit thereof. The element having the d or f orbit can easily exchange the electron of the d or f orbit of the catalyst component, and can therefore undergo chemical adsorption with the catalyst component. When such an element is selected as the replacing element, the catalyst can be directly supported.

In a sixth aspect of the invention, the catalyst component is directly supported by the element constituting the substrate of the support described above. When the constituent elements of the support contain the element that is easily bondable with the catalyst component, the catalyst component can be easily supported without introducing the replacing element.

In a seventh aspect of the invention, the fine pore described above is at least one kind selected from the defect in the crystal lattice constituting the substrate, the fine crack on the substrate surface, and the defect of the element constituting the substrate. When the fine pore formed in this way is provided to the support surface, these fine pores can directly support the catalyst component.

In an eighth aspect of the invention, the fine pore comprises the defect inside the crystal lattice formed by replacing one or more kinds of the constituent elements of the substrate by elements other than the constituent elements. When the constituent elements are replaced by elements having different valence, the defect occurs in the crystal lattice, and this defect can directly support the catalyst component. The lattice defect, for example, can directly support the catalyst component in physical cavities formed in the crystal lattice, and a higher support strength can be accomplished through the anchor effect than through physical adsorption to the surface of the coating layer as in the prior art technologies.

In a ninth aspect of the invention, the substrate of the support described above contains, as its main component, cordierite, zeolite, perovskite, titania, silica, ceria, zirconia, alumina, magnesia, spinel, mullite, aluminum titanate, zirconium phosphate, silicon carbide, silicon nitride, silica-alumina or their derivatives. When the combination of the constituent elements of the ceramics, the replacing elements introduced and the catalyst component is selected appropriately, it becomes possible to obtain a catalyst body that has a support strength of a desired level and that does not easily undergo degradation.

In a tenth aspect of the invention, the catalyst component uses at least one kind of the members, or a mixture or a solid solution of at least two kinds of members, selected from the group consisting of Pt, Pd, Rh, Ag, Au, Ce and their oxides. The catalyst component may be at least one kind of members, or a mixture or a solid solution of two or more kinds of members, selected from transition metal elements and their oxides. When the members are selected appropriately in accordance with the application, catalyst performance can be improved.

BREIF DESCRIPTION OF THE DRAWINGS

Figure 2:
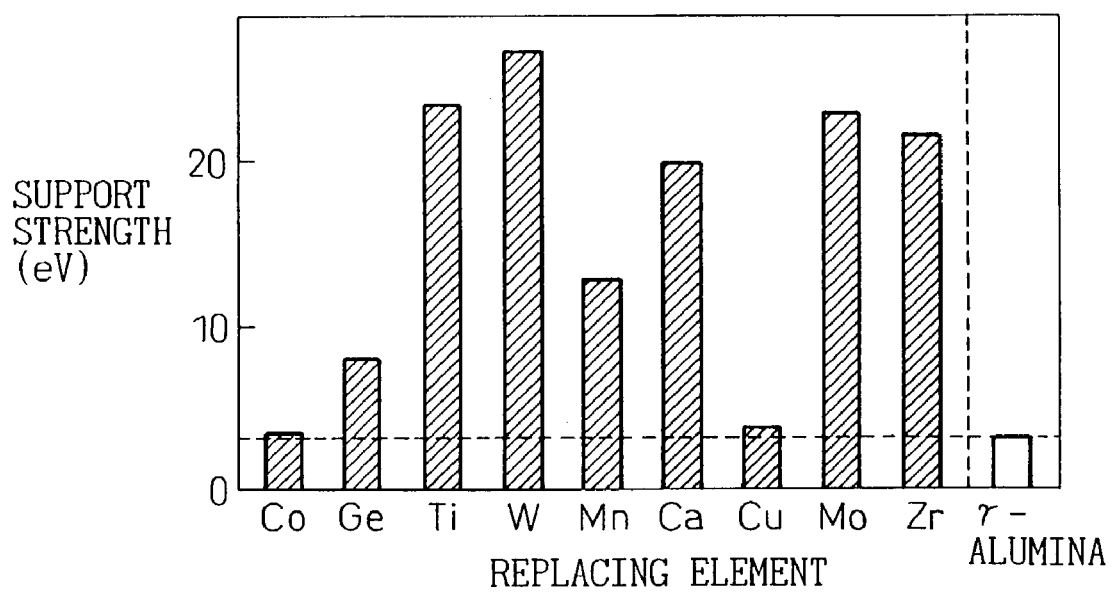
Figure 3:
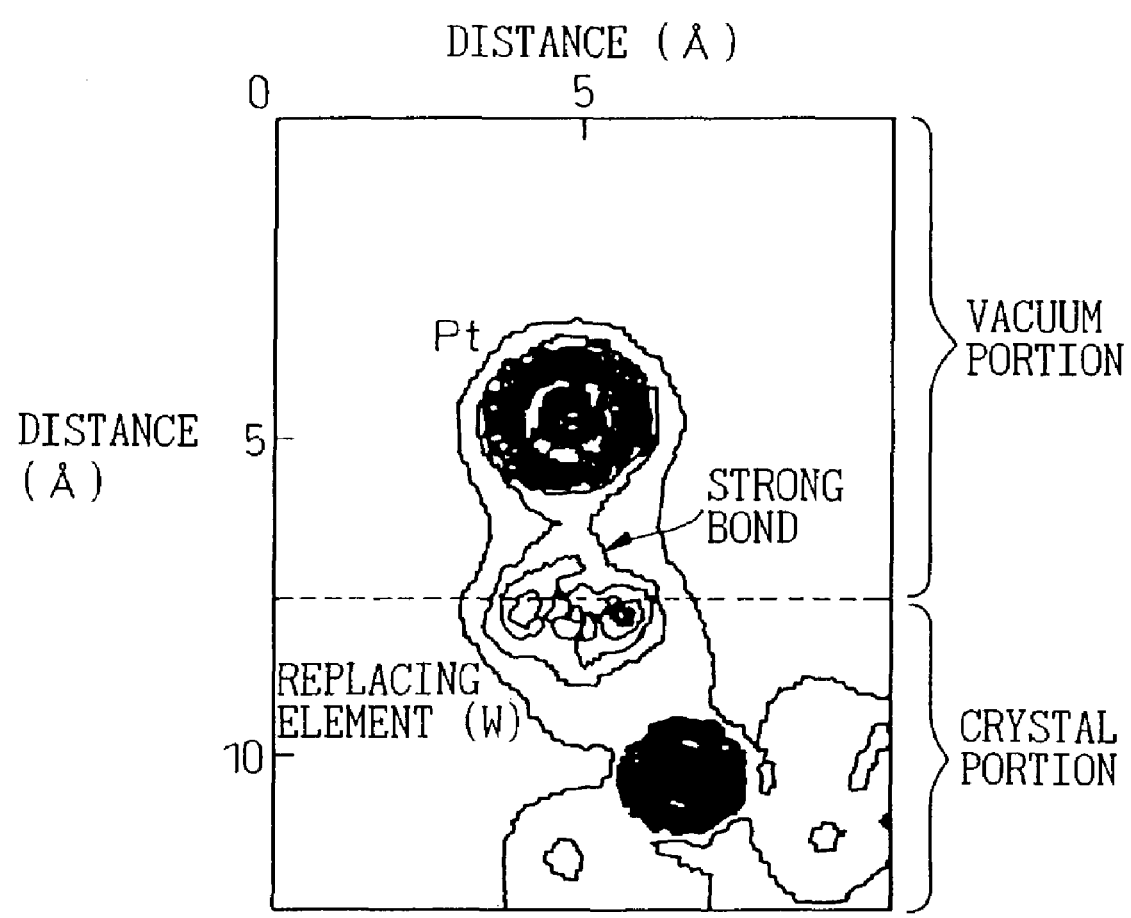

FIG. 1 shows a structure of a catalyst body according to the invention;

FIG. 2 is a diagram showing a relationship, in support strength, between a transition metal seed as a replacing element introduced into a support substrate and a catalyst element in comparison with the case where the support substrate is γ-alumina; and FIG. 3 shows an electron density state diagram when a catalyst component (Pt) is chemically adsorbed to a replacing element (W) inside a support substrate.

DESCRIPTION OF THE PREFERRED EMBODIMENTS

The invention will be hereinafter explained in detail with reference to the accompanying drawings. A catalyst body according to the invention directly supports the catalyst component on the surface of a support, and the catalyst component is directly supported by at least one of the elements and the fine pores inside the support. The support uses a ceramic support such as a support consisting of cordierite as a main component and having a theoretical composition of $2MgO \cdot 2Al_2O_3 \cdot 5SiO_2$. Cordierite has high heat resistance and is suitable as a support of an automobile catalyst used under a high temperature condition. It is also possible to use ceramic supports other than cordierite, such as those containing zeolite, perovskite, titania, silica, ceria, zirconia, alumina, magnesia, spinel, mullite, aluminum titanate, zirconium phosphate, silicon carbide, silicon nitride, silica-alumina and their derivatives as their main components.

These substrate ceramics are molded into a predetermined shape and the molding is then sintered to give the ceramic support. The ceramic support may be a honeycomb structure having a large number of cells in parallel with a gas flowing direction. The cell shape may be rectangular, polygonal and various other shapes. The support shape is not limited to the honeycomb structure but may take various other shapes such as pellet, powder, foam, hollow fiber, fiber, and so forth.

The catalyst component supported by this ceramic support is at least one kind of metal, and a mixture or a solid solution of at least two kinds of metals, selected from the group consisting of Pt, Pd, Rh, Ag, Au and Ce and their oxides, and at least one kind of a transition metal element and its oxide or a mixture or a solid-solution of at least two kinds of transition metal elements and their oxides. These catalyst components are selected in accordance with the substrate of the ceramic support so that the support strength with the element or the defect inside the ceramic support achieves a predetermined strength depending on application.

In the catalyst body of the invention, these catalyst components are directly supported through chemical adsorption by the element or fine pores inside the ceramic support. The element inside the ceramic support may be a constituent element of the support substrate or a replacing element that is introduced into the substrate while replacing the substrate constituent element. When the ceramic support contains W, Ti, Co and Mo as the constituent elements, for example, the catalyst components can be directly supported by these elements. Examples of such a ceramic support include tungsten oxide ($WO_3$) and titania ($TiO_2$). Those elements that can more easily achieve chemical adsorption than these constituent elements can be used to replace the latter, and the catalyst components can be directly supported with higher support strength. On the other hand, when the ceramic support contains Al, Si and Mg, at least one of the substrate constituent elements is preferably replaced by an element other than the constituent elements because the cordierite does not, as such, adsorb chemically the catalyst component, and the catalyst components can be directly supported by the replacing element. In this way, the catalyst component can be supported and the reducing effect of the thermal capacity and the pressure loss can be accomplished without forming the coating layer having a high specific surface area such as γ-alumina.

The elements for replacing the constituent elements of the substrate ceramic, or the elements for replacing Si, Al and Mg as the constituent elements other than oxygen in the case of cordierite, for example, have higher support strength for the catalyst component to be supported than the constituent elements and can support the catalyst components through chemical adsorption. More concretely, the replacing elements are different from the constituent elements and have a d or f orbit in their electron orbit. Preferably the replacing elements have a vacant orbit in the d or f orbit and two or more oxidation states. Because the catalyst components to be supported also have the d or f orbit, the elements having the vacant orbit in the d or f orbit have an approximate energy level, can easily exchange the electrons and can easily bond with the catalyst components. The elements having two oxidation states, too, can easily exchange the electrons and are expected to provide similar operations because the change of valence occurs relatively easily.

Concrete examples of the elements having the vacant orbit in the d or f orbit are W, Ti, V, Cr, Mn, Fe, Co, Ni, Zr, Mo, Ru, Rh, Ce, Ir and Pt. At least one kind of these elements can be used. Among these elements, W, Ti, V, Cr, Mn, Fe, Co, Mo, Ru, Rh, Ce, Ir and Pt are the elements having two or more oxidation state.

The amount of the replacing element is such that the total replacing amount is 0.01 to 50%, preferably 5 to 20%, of the atomic number of the constituent element to be replaced. When the replacing element has different valence from that of the constituent element of the ceramic, the lattice defect or the oxygen defect simultaneously occurs in accordance with the difference of valence. In the invention, the fine pores formed by these defects can support the catalyst component. Alternatively, a plurality of replacing elements is used in such a fashion that the sum of the oxidation number of the replacing elements is equal to the sum of the oxidation umber of the constituent elements to be replaced. As the change of valence does not occur, as a whole, in this case, the defects are not created. Generally, support by the element has higher support strength than support by the fine pore. Therefore, this method can support the catalyst component through only chemical adsorption with the replacing element, and resistance to degradation becomes higher.

As to the fine pores formed on the ceramic surface, the defect of the crystal lattice includes the oxygen defect and the lattice defect (metal vacant lattice point and lattice strain). The oxygen defect is the defect that is created when oxygen for constituting the ceramic crystal lattice becomes insufficient. The fine pores formed by fall-off of oxygen can support the catalyst component. The lattice defect is the defect that occurs when oxygen is entrapped in an amount greater than necessary for constituting the ceramic crystal lattice. The catalyst component can be supported in the fine pores formed by the strain of the crystal lattice and by the metal vacant lattice point.

Besides the defects in the ceramic crystal lattice (lattice defect or oxygen defect), the fine pores capable of directly supporting the catalyst component includes fine cracks on the ceramic surface and the defect of the element constituting the ceramic. At least one or a plurality of kinds of these defects can be used in combination. The diameter of the catalyst component ion to be supported is generally about 0.1 nm. Therefore, when these fine pores have a diameter or width of 0.1 nm or more, they can support the catalyst component ion. To secure the ceramic strength, the diameter or width of the fine pores is not greater than 1,000 times (100 nm) of the diameter of the catalyst component ion and is preferably as small as possible. The diameter or width of the fine pore is preferably 1 to 1,000 times (0.1 to 100 nm). The depth of the fine pores is preferably at least ½ times (0.05 nm) its diameter to retain the catalyst component ion. To support the catalyst component in an amount equivalent to the conventional amount (1.5 g/L) at this size, the number of fine pores is at least $1 \times 10^{11}$/L, preferably $1 \times 10^{16}$/L and more preferably at least $1 \times 10^{17}$/L.

Concretely, the number of fine pores of the ceramic support exceeds the predetermined number described above when the cordierite honeycomb structure contains at least $4 \times 10^{-6}$%, preferably at least $4 \times 10^{-5}$%, of cordierite crystals having at least one kind of oxygen defect or lattice defect in a unit crystal lattice, or contains $4 \times 10^{-8}$ pieces, preferably at least $4 \times 10^{-7}$ pieces of at least one kind of oxygen defect or lattice defect in a unit crystal lattice of cordierite.

A method of forming the defects in the crystal lattice is described in Japanese Patent Application No. 2000-104994. For example, the oxygen defect can be formed by replacing a part of at least one kind of constituent elements other than oxygen of the cordierite material containing an Si source, An Al source and an Mg source by an element having smaller valence than the constituent element during a molding, degreasing and sintering process. In the case of cordierite, the constituent elements have positive charges, that is, Si (4+), Al (3+) and Mg (2+). When these elements are replaced by elements having smaller valence, the positive charge corresponding to the difference of valence from the replacing element and to the replacing amount becomes insufficient, O (2−) having the negative charge is emitted to keep electric neutrality as the crystal lattice, and the oxygen defect is formed.

The lattice defect can be formed by replacing a part of the ceramic constituent elements other than oxygen by an element having greater valence than the constituent elements. When at least a part of Si, Al and Mg as the constituent elements of cordierite is replaced by an element having greater valence, the positive charge becomes excessive in the amount corresponding to the difference of valence from the replacing element and to the replacing amount, and O (2−) having the negative charge is entrapped in an amount necessary for keeping electric neutrality as the crystal lattice. Oxygen so entrapped becomes an obstacle and the cordierite crystal lattice cannot be aligned in regular order, thereby forming the lattice strain. The sintering atmosphere in this case is an atmosphere where oxygen can be sufficiently supplied. Alternatively, a part of Si, Al and Mg is emitted to keep electric neutrality, and voids are formed. Since the size of these defects is believed to be several angstroms or below, the defects cannot be measured as a specific surface area by an ordinary measurement method of a specific surface area such as a BET method using the nitrogen molecules.

The numbers of the oxygen and lattice defects have correlation with the oxygen amount contained in cordierite. To support the necessary amount of the catalyst component described above, the oxygen amount is preferably less than 47 wt % (oxygen defect) or greater than 48 wt % (lattice defect). When the oxygen amount is less than 47 wt % due to the formation of the oxygen defect, the oxygen number contained in the cordierite unit crystal lattice becomes smaller than 17.2, and the lattice constant of the $b_o$ axis of the crystal axis of cordierite is smaller than 16.99. When the oxygen amount becomes greater than 48 wt % due to the formation of the lattice defect, the oxygen number contained in the cordierite unit crystal lattice becomes greater than 17.6, and the lattice constant of the $b_o$ axis of the crystal axis of cordierite becomes greater or smaller than 16.99.

Here, the invention selects the combination of the catalyst component and the element or the fine pore supporting the catalyst component on the basis of simulation using a density functional method. The support strength of the catalyst component and the element or the fine pore is calculated by simulation using the density functional method, and the combination of the catalyst component with the inter-support element (constituent element or replacing element) or the fine pore (defect) is selected from the combination that provides a value greater than 5 eV. In this way, coarsening of the catalyst component during use at a high temperature can be suppressed. When the simulation value using the density functional method is greater than 5 eV, the catalyst component is selectively adsorbed (chemical adsorption) with strong force to the element or the fine pore. In consequence, migration and coarsening due to heat are believed to be difficult to generate. When the simulation value is smaller than 5 eV, adsorption changes to physical adsorption not having position selectivity of the adsorption site, and the support strength drops. The simulation value is preferably at least 15 eV. The support strength becomes stronger, the effect of suppressing coarsening becomes higher and degradation can be prevented.

The density functional method is the method that estimates the electron state of the crystal by introducing Hamiltonian employing the co-functional effect among multiple electrons. The principle is based on a mathematical theory that all energy of the ground state of a system can be expressed by a functional of an electron density. This method has high reliability as means for calculating the electron state of the crystal. The conventional catalyst body has the construction in which the catalyst component is supported on the surface of the coating layer having a large specific surface area such as alumina through physical adsorption. Therefore, the support strength with Al constituting the coating layer is extremely weak and the catalyst component easily moves. When the construction is such that the catalyst component is supported by the element inside the support in the same way as the catalyst body according to the invention, coarsening is unavoidable when the support strength is not sufficient. However, it is extremely difficult in practice to measure the support strength between the catalyst component and the element or the fine pore, and means becomes necessary for estimating the combination providing desired support strength. The density functional method is suitable for estimating the electron state at the interface between the support surface made of an oxide, etc, and the catalyst component. As a matter of fact, it has been confirmed that coarsening of the catalyst particles does not occur in the catalyst body having the combination of the catalyst component and the element selected on the basis of the simulation value, and the catalyst body exhibits high purification performance even after high temperature durability.

A production method of the catalyst body according to the invention will be described next. When the ceramic support in which a part of the constituent elements of the substrate ceramic is replaced by an element having high support strength with the catalyst component is used, a ceramic starting material in which a part of the starting material of the constituent element to be replaced is decreased in advance in accordance with the replacing amount is used. A predetermined amount of the starting material of the replacing element is added to this ceramic starting material. After kneaded in a customary manner, the mixture is molded into a honeycomb shape, dried and sintered to give a ceramic support in which the element is replaced. If the replacing element has a different valence from that of the constituent element of the ceramic at this time, the lattice defect or the oxygen defect is simultaneously formed in accordance with the difference of valence. Alternatively, a ceramic starting material is prepared in which a part of the starting material of the constituent element to be replaced is decreased in advance in accordance with the replacing amount. The ceramic starting material is then kneaded, molded and dried, and the molding so obtained is immersed in a solution containing the replacing element. The latter method can cause a greater amount of the replacing element to exist on the surface of the molding. As a result, element substitution occurs on the surface during sintering and a solid solution is more likely to occur. Because only the surface is subjected to element substitution, the influences on the characteristics of the substrate ceramic are small.

When the substrate constituent element of the ceramic support can directly support the catalyst component, the ceramic starting material is kneaded, molded, dried and sintered in an ordinary way to give a ceramic support. In the case of the honeycomb structure, the thickness of the cell walls is generally 150 μm or below. The smaller the wall thickness, the smaller becomes thermal capacity.

Next, the catalyst component such as Pt, Rh, Pd, etc, is directly supported on the resulting ceramic support to give the ceramic catalyst body of the invention. The catalyst component can be supported in accordance with the ordinary method that immerses the ceramic body in a solution containing the catalyst component and then conducts sintering. When a plurality of catalyst components is supported, process steps of immersing the ceramic body into a solution containing each catalyst component and sintering are repeated. Alternatively, the ceramic body is immersed into a solution containing a plurality of catalyst components, is sintered and is simultaneously supported. The catalyst particle has a mean particle diameter of 100 μm or below, preferably 50 μm or below. The catalyst particles can be dispersed more closely on the support surface when their particle size is smaller, and purification performance per catalyst weight can be improved.

In the ceramic catalyst body so obtained, the catalyst component is directly adsorbed to the element inside the support with predetermined support strength without through the coating layer. Therefore, adsorption is firm and strong, and the catalyst component does not easily move. Even when used at a high temperature for a long time, therefore, the ceramic catalyst body can prevent the catalyst particles from aggregating and coarsening, and keeps high performance without inviting thermal degradation.

EXAMPLE 1

Talc, kaolin, alumina and aluminum hydroxide were used as cordierite materials, and 20% of the Al material as the cordierite constituent material was decreased. Next, $WO_3$ corresponding to 10% of Al as the constituent element and $TiO_2$ similarly corresponding to 10% of Al element were added in such a fashion that the resulting composition was approximate to a theoretical composition point of cordierite. After suitable amounts of a binder, a lubricant, a humectant and moisture were added to the starting materials, the mixture was kneaded and converted to clay. The resulting clay was shaped into a honeycomb shape having a cell wall thickness of 100 μm, a cell density of 400 cpsi and a diameter of 50 mm. After being dried, the honeycomb structure was sintered at 1,390° C. for 2 hours in an atmosphere to obtain a ceramic support into which W and Ti were introduced as the replacing elements. Here, two kinds of elements (w and Ti) were used as the replacing elements lest the lattice defect occurred in cordierite.

To first support Pt as the catalyst component on the ceramic support so obtained, an ethanol solution containing 0.035 mol/L of platinic chloride was prepared. The ceramic support was immersed in this solution for 5 minutes. After an excessive solution was removed, the ceramic support was dried and was then sintered at 600° C. in the atmosphere to metallize Pt. In this way, a ceramic catalyst body in which Pt as the catalyst element was directly supported by W and Ti as the replacing elements (inter-support elements) was obtained.

To evaluate purification performance of the resulting ceramic catalyst body, a model gas containing $C_3H_6$ was introduced and a 50% purification temperature (initial T50, unit: ° C.) of $C_3H_6$ was measured. The evaluation condition was listed below. The thermal durability test was conducted by leaving the ceramic catalyst body standing at 1,000° C.

for 24 hours in the atmosphere and the 50% purification temperature (T50 after being left standing, unit: ° C.) was measured.

| Model gas: | |
|---|---|
| $C_3H_6$: | 500 ppm |
| $O_2$: | 2.5% |
| $N_2$: | balance |
| SV = | 10,000 |

TABLE 1

| | support component | inter-support element | catalyst element | simulation value | particle diameter (nm) initial | particle diameter (nm) after left standing | T50 (° C.) initial | T50 (° C.) after left standing |
|---|---|---|---|---|---|---|---|---|
| Comp. Example 1 | alumina | Al | Pt | 3 | 3 | 68 | 175 | 235 |
| Comp. Example 2 | magnesia | Mg | Pt | 2 | 4 | 50 | 200 | 290 |
| Comp. Example 3 | silica | Si | Pt | 1 | 10 | 80 | 195 | 250 |
| Comparative Example 4 | cordierite | Si | Pt | 4 | 20 | 300 | 200 | 374 |
| Example 1 | cordierite | W | Pt | 26 | | | | |
| | | Ti | Pt | 16 | 9 | 12 | 190 | 195 |
| Example 2 | cordierite | W | Pt | 26 | | | | |
| | | Co | Pt | 15 | 9 | 13 | 190 | 195 |
| Example 3 | cordierite | W | Pt | 26 | | | | |
| | | lattice defect | Pt | 10 | 9 | 15 | 195 | 200 |
| Example 4 | cordierite | Ti | Pt | 22 | 10 | 17 | 190 | 205 |
| Example 5 | cordierite | Zr | Pt | 19 | 12 | 20 | 195 | 210 |
| Example 6 | alumina | W | Pt | 22 | | | | |
| | | lattice defect | Pt | 6 | 3 | 25 | 180 | 210 |
| Example 7 | tungsten oxide | W | Pt | 11 | 10 | 40 | 200 | 220 |
| Example 8 | titania | Ti | Pt | 16 | 3 | 30 | 200 | 215 |
| Example 9 | titania | W | Pt | 24 | | | | |
| | | lattice defect | Pt | 6 | 5 | 20 | 190 | 200 |

CO chemical adsorption amount was measured for the resulting ceramic catalyst body. The catalyst particle diameter (mean) before and after the durability test was measured, and the result was also described in Table 1. It was confirmed through WDX analysis by TEM (transmission electron microscope) that W and Ti as the replacing elements (inter-support elements) directly supported Pt as the catalyst element. Incidentally, Table 1 tabulates also the simulation value estimating the Pt support strength of W and Ti replacing a part of Al as the constituent element of cordierite by conducting simulation by the density functional method. The calculation conditions of analytical hardware/software when simulation was conducted by the density functional method are tabulated below.

Pre/post: Cerius2 ver4.2 (Accelrys Co.)
Solva: CASTEP, Crystal Builder (Accelrys Co.)
W/S: (SGI Co.) Octane2
CPU time: approx. 70,000 s
Temperature: absolute 0
Approximation: GGA approximation FIG. 1 is an exemplary model view used for simulation of the support intensity by the density functional method. The cordierite crystal is produced by use of commercial simulation software (Crystal Builder) of Accelrys Co., U.S.A., and a stabilization structure of the crystal at absolute 0 (0K) is determined by use of software (CASTEP) of the same company. GGA approximation is used for calculation. Thereafter, the crystal is cut with a (100) plane as the most abundant surface by use of the software (Surface Builder and Crystal Builder) of the company, and a model having a vacuum portion at its upper part is produced. The catalyst component (here, Pt) is put at this vacuum portion, and the energy change when Pt is brought close to the transition metal element (for example, W) on the cordierite interface is calculated to estimate the support strength. The calculation method of the support strength determines the difference between energy when the cordierite interface and Pt do not at all interact and energy when Pt is adsorbed to the cordierite interface. The greater this energy difference, the catalyst component can be more stably held by adsorption, that is, the support strength is greater.

EXAMPLES 2 TO 9

A ceramic catalyst body was produced in the same way as in Example 1 with the exception that the elements that were to replace Al as an element constituting cordierite were W and Co, and their oxides $WO_3$ and CoO were added to the cordierite starting materials. Similarly, ceramic catalyst bodies were produced by setting the replacing element to W, Ti or Zr and adding the respective oxide $WO_3$, $TiO_2$ or $ZrO_2$ to the cordierite starting materials (Examples 3 to 5). Since the replacing element is one kind (W) in Example 3, the lattice defect simultaneously occurred, and the replacing element (W) and the lattice defect supported the catalyst element (Pt). Examples 4 and 5 selected the replacing element that did not create (or hardly created) the lattice defect.

In Examples 6 to 9, the ceramic catalyst bodies were produced in which the support substrate was changed to alumina, tungsten oxide or titania as tabulated in Table 1 and the inter-support element for supporting the catalyst element (Pt) was W or Ti. Here, W in Examples 6 and 9 was introduced as the replacing element in the same way as in each of Examples described above. Element substitution was not effected in Examples 7 and 8, and W and Ti as the support constituent elements directly supported the catalyst element.

Purification performance and the catalyst particle diameter were measured for the ceramic catalyst bodies of these Examples 2 to 9 in the same way as in Example 1. Table 1 tabulates the results with the simulation value of the Pt support strength of the inter-support element or the lattice defect by the density functional method.

COMPARATIVE EXAMPLES 1 TO 4

For comparison, on the other hand, a ceramic catalyst body supporting Pt as the catalyst element was produced in the same way as in Example 1 by use of a ceramic support that used alumina as the support base material and into which the replacing element was not introduced (Comparative Example 1). Purification performance and the catalyst particle diameter were measured in the same way as in Example 1. Table 1 tabulates the results with the simulation value of the support strength of Al and Pt as the substrate constituent components (the inter-support elements) by the density functional method. Ceramic catalyst bodies supporting Pt as the catalyst element were produced in the same way for the ceramic supports using magnesia, silica and cordierite as the support substrate, respectively (Comparative Examples 2 to 4). Purification performance and the catalyst particle diameter were measured for the ceramic catalyst bodies in the same way, and Table 1 tabulates the results with the simulation value of the Pt support strength of Mg or Si as the substrate constituent components (inter-support element) by the density functional method.

It can be clearly seen from Table 1 that coarsening of the particles due to thermal durability test was remarkable in Comparative Examples 1 to 4 in which the simulation value by the density functional method was 5 eV or below. This was presumably because the catalyst element was merely supported through physical adsorption in the combinations having the simulation value of 5 eV or below. Because position selectivity of the adsorption site did not exist, the catalyst particles could be adsorbed to any portion, but the adsorption strength was so weak that the catalyst particles could easily move and aggregate due to thermal oscillation, or the like. In contrast, it was found that in Examples 1 to 9 in which the simulation value was greater than 5 eV, the change of the particle diameter after the thermal durability test was small and support was firm and strong. Therefore, when the simulation value was greater than 5 eV, adsorption entered the region of chemical adsorption, position selectivity of the adsorption site existed, and because the catalyst element was selectively adsorbed with high strength to the replacing element, movement and coarsening due to heat did not easily occur.

As to purification performance, there was no greater difference in the initial 50% purification temperature (T50) between Example and Comparative Example. However, in the 50% purification temperature (T50) after each sample was left standing, Examples were within the range of 195 to 220° C., whereas performance dropped in Comparative Examples to 235 to 400° C. Accordingly, clear correlation could be observed among the simulation value by the density functional method, the catalyst particle diameter and purification performance. It was confirmed that when the combinations having a simulation value of at least 5 eV were selected, the support strength could be improved and the grain growth of the catalyst component due to thermal durability could be suppressed. The effect of suppressing coarsening and the improving effect of purification performance became greater when the simulation value was greater. Speaking more concretely, the simulation value was preferably 15 eV or more. As described above, the coarsening suppression effect became different depending on the support strength even supporting was based on chemical adsorption, but high temperature durability could be effectively improved when the combination having higher support strength was found on the basis of the simulation value according to the invention.

FIG. 2 shows the support strength (simulation value by the density functional method) of the catalyst element (Pt) when the support substrate is cordierite and the transition metal seed as the replacing element to be introduced is variously changed, in comparison with the support strength of γ-alumina constituting the conventional coating layer and Pt. It can be seen from the drawing that in any of the cordierite replacing elements, Pt is adsorbed with higher support strength than γ-alumina. Particularly when Ti, W, Mn, Ca, Mo and Zr are selected, the effect is remarkable. The intensity of the support strength varies with the difference of the element kind, and this difference may presumably depend on the vacant orbit state of the d orbit of the replacing element and on the oxidation state.

FIG. 2 shows the case where the kind of the replacing element is one (+ lattice defect), but the kind of the replacing element may be two or more. (Example 1 represents replacement by two kinds and Examples 2 to 4 represent replacement by one kind). FIG. 3 shows the electron density state diagram of the W element exhibiting the highest support strength as the single replacing element among those shown in FIG. 2 during its adsorption. It can be confirmed that the outer shell orbit of Pt and the outer shell orbit of W as the replacing element inside cordierite overlap with one another and Pt is chemically adsorbed to the W element.

As described above, the present invention uses the density functional method capable of estimating the support strength of the catalyst component in the actual catalyst body with a high level of accuracy, selects the optimal combination on the basis of the simulation value and can easily provide a high-performance catalyst body having desired support strength.

What is claimed is:

1. A catalyst body directly supporting a catalyst component on a surface of a support, wherein said catalyst component is directly supported by at least one of elements and fine pores inside said support, and support strength of said catalyst component by said elements or said fine pores inside said support is greater than 5 eV by simulation using a density functional method.

2. A catalyst body according to claim 1, wherein said support is a ceramic support.

3. A catalyst body according to claim 1, wherein support strength of said catalyst component by said elements or said fine pores inside said support is at least 15 eV by simulation using a density functional method.

4. A catalyst body according to claim 1, wherein one or more kinds of constituent elements of a substrate of said support are replaced by elements other than said constituent elements, and said catalyst component is directly supported by said replacing element.

5. A catalyst body according to claim 4, wherein said replacing element is one or more kinds of elements having a d or f orbit in an electron orbit thereof.

6. A catalyst body according to claim 1, wherein said catalyst component is directly supported by the element constituting the substrate of said support.

7. A catalyst body according to claim 1, wherein said fine pores are from a defect in a crystal lattice constituting said substrate.

8. A catalyst body according to claim 7, wherein said fine pores are defects formed by replacing at least one kind of constituent elements of said substrate by an element other than said constituent element, and said catalyst component is directly supported by said defects.

9. A catalyst body according to claim 1, wherein said support is comprised by a substrate containing as a main component a member selected from the group consisting of cordierite, zeolite, perovskite, titania, silica, ceria, zirconia, alumina, magnesia, spinel, mullite, aluminum titanate, zirconium phosphate, silicon carbide, silicon nitride, silica-alumina and their derivatives.

10. A catalyst body according to claim 1, wherein said catalyst component is at least one kind of members, or a mixture or a solid solution of two or more members, selected from the group consisting of Pt, Pd, Rh, Ag, Au, Ce and their oxides.

11. A catalyst body according to claim 1, wherein said catalyst component is at least one kind of member, or a mixture or a solid solution of two or more members, selected from transition metal elements and their oxides.

* * * * *